United States Patent [19]

Ploix

[11] Patent Number: 4,847,686

[45] Date of Patent: Jul. 11, 1989

[54] RADIOLOGICAL INSTALLATION USING A CAMERA TELEVISION WITH LOW-REMANENCE PICK-UP ELEMENT

[75] Inventor: Jean L. Ploix, Issy Les Moulineaux, France

[73] Assignee: Thomson-CGR, Paris, France

[21] Appl. No.: 95,115

[22] Filed: Sep. 11, 1987

[30] Foreign Application Priority Data

Sep. 12, 1986 [FR] France ............................ 86 12818

[51] Int. Cl.$^4$ .......................... H04N 7/18; H04N 5/32
[52] U.S. Cl. .................................... 358/93; 358/111; 358/213.28; 378/99
[58] Field of Search ................. 358/111, 110, 93, 160, 358/213.28, 140; 378/99

[56] References Cited

U.S. PATENT DOCUMENTS

| | | | |
|---|---|---|---|
| 3,889,239 | 6/1975 | Gillissen | 358/83 |
| 4,062,009 | 12/1977 | Rowerdy et al. | 340/763 |
| 4,123,346 | 10/1978 | Ploix | 204/299 R |
| 4,253,113 | 2/1981 | Decavel et al. | 358/106 |
| 4,382,187 | 5/1983 | Fraleux et al. | 250/578 |
| 4,394,684 | 7/1983 | Verhoeven | 358/111 |
| 4,486,767 | 12/1984 | Fraleux et al. | 357/23.14 |
| 4,504,908 | 3/1985 | Riederer et al. | 358/111 |
| 4,507,081 | 3/1985 | Verhoeven et al. | 358/111 |
| 4,577,222 | 3/1986 | Kruger et al. | 358/111 |
| 4,580,164 | 4/1986 | Andrieu et al. | 358/140 |
| 4,617,595 | 10/1986 | Berger | 358/213.26 |
| 4,635,104 | 1/1987 | Hausdörfer | 358/31 |
| 4,643,689 | 2/1987 | Fraleux et al. | 445/3 |
| 4,663,773 | 5/1987 | Haendle et al. | 378/99 |
| 4,677,478 | 6/1987 | Kruger et al. | 358/111 |

FOREIGN PATENT DOCUMENTS 2122050 1/1984 United Kingdom .

Primary Examiner—James J. Groody
Assistant Examiner—John K. Peng
Attorney, Agent, or Firm—Oblon, Spivak, McClelland, Maier, & Neustadt

[57] ABSTRACT

An imaging installation, especially for digital type radiology, comprises a pick-up tube television camera with no remanence or low remanence with a non-linear element producing a remanence of the image signal given by the camera. The remanence varies with the level of the signal. When a recursive filter is used to obtain this remanence which is variable with the signal level, the modulation $f_2$, introduced by the modulator connected to the output of this filter by a frames memory, is defined by the function: $f_2(x) = x[\lambda(1-g(x)) + \mu g(x)]$, a formula in which x is the ratio between the signal applied at the input of this modulator and the maximum value of the input signal, $\lambda$ and $\mu$ are constants, and g(x) is a linear function of x meeting the conditions: g(0) and g(1) = 1.

11 Claims, 3 Drawing Sheets

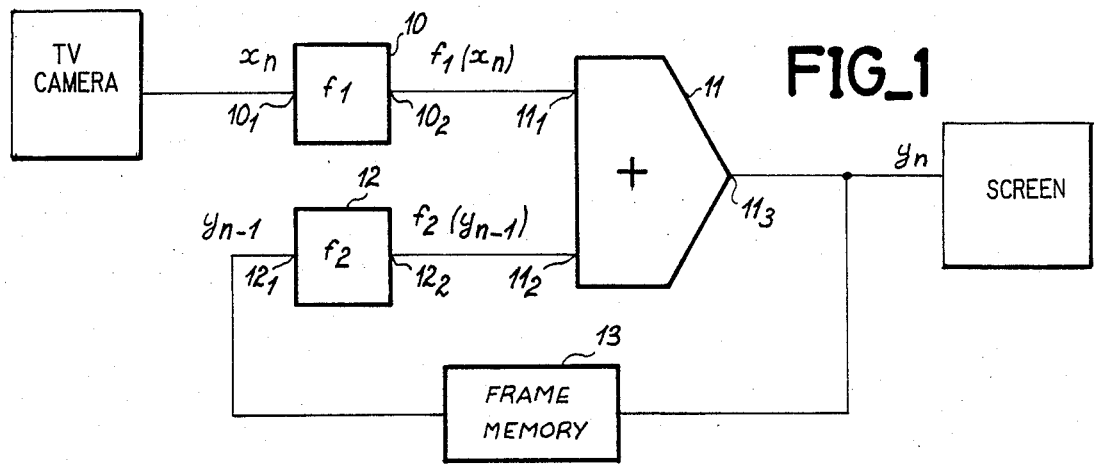
FIG_1
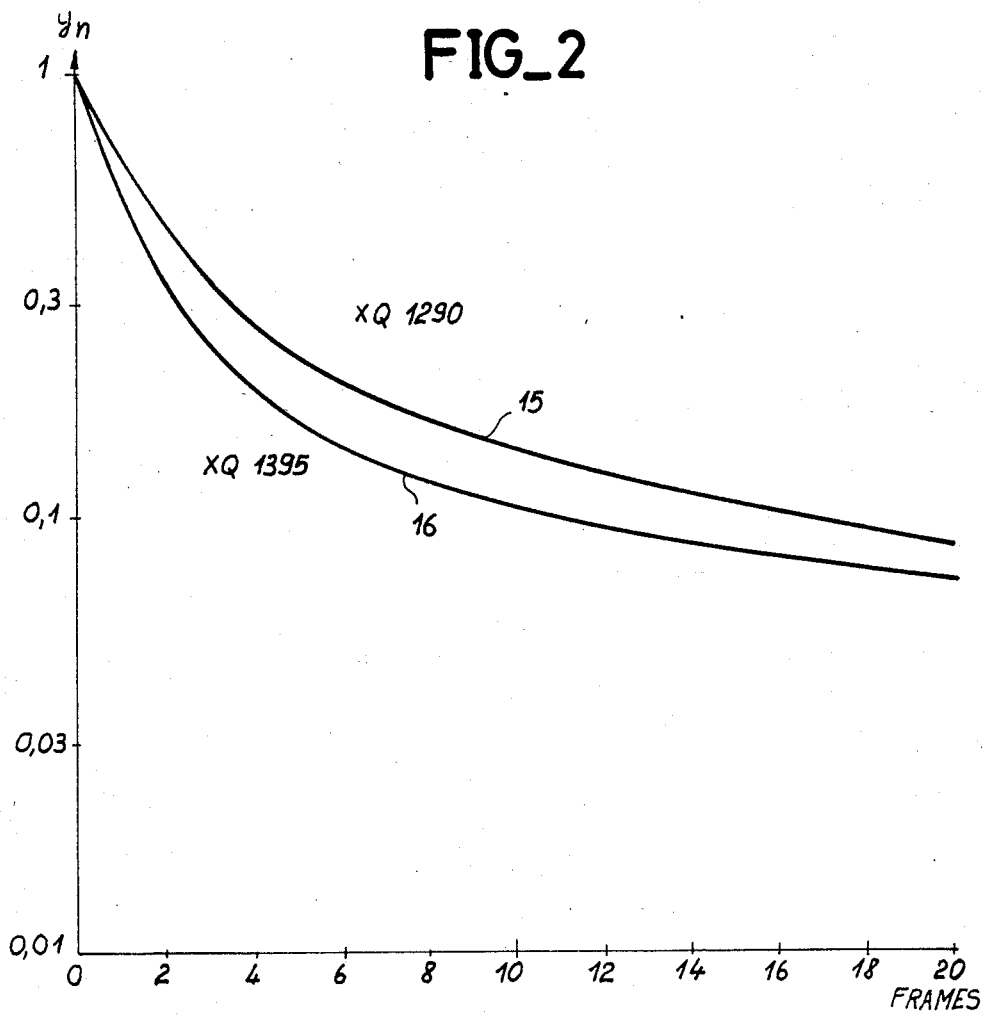
FIG_2

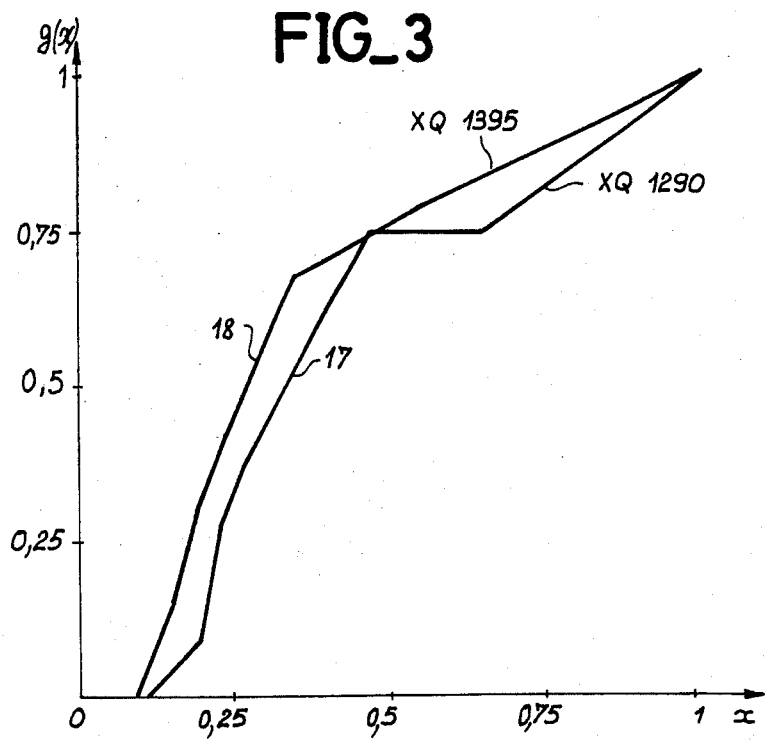
FIG_3
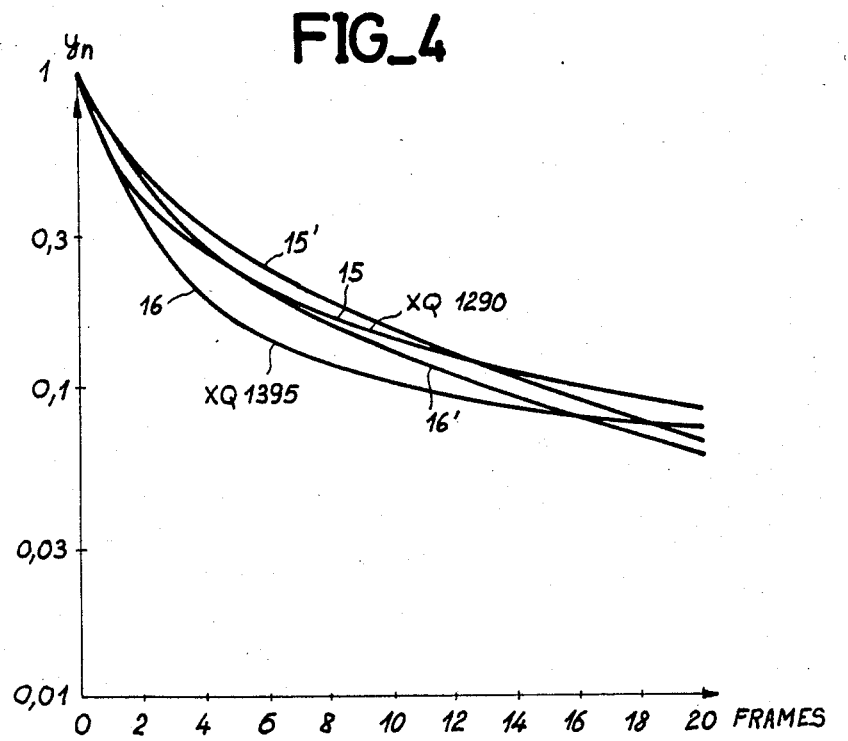
FIG_4

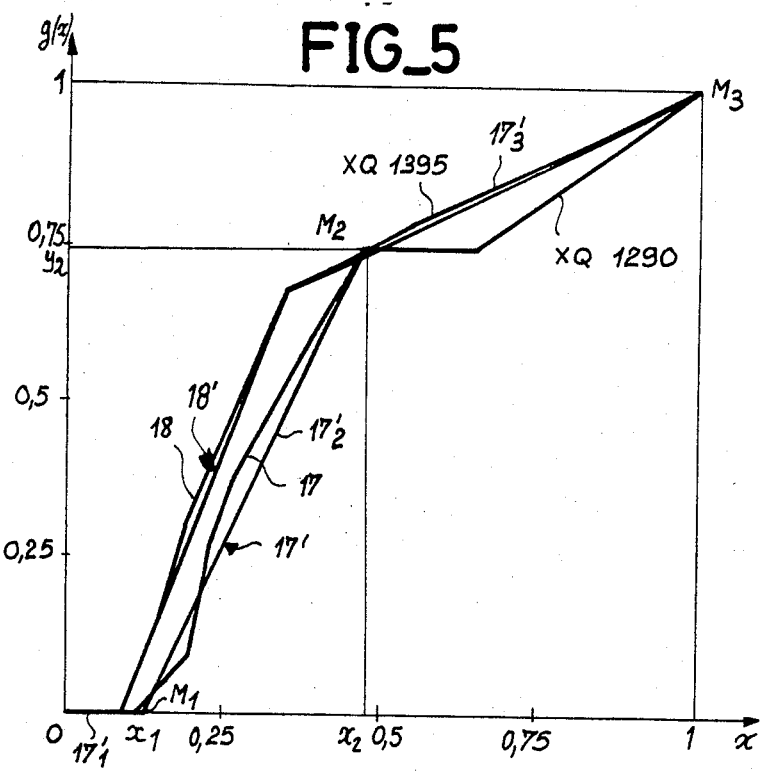
FIG_5
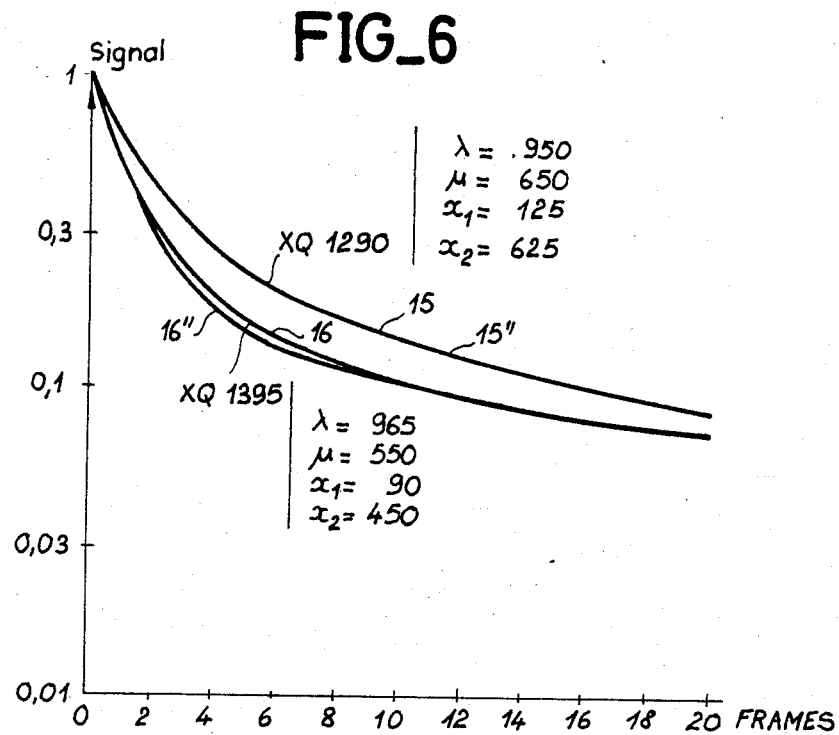
FIG_6

RADIOLOGICAL INSTALLATION USING A CAMERA TELEVISION WITH LOW-REMANENCE PICK-UP ELEMENT

BACKGROUND OF THE INVENTION

1. Field of the Invention

The invention pertains to an imaging installation, especially for radiology, comprising a television camera with a pick-up device presenting no remanence or low remanence.

2. Description of the Prior Art

A radioscopic installation generally comprises a television camera for the viewing of images given by a luminance amplifier that transforms an X-ray image into an image in visible light. The camera can be used to view images on a television-type screen. In a so-called "digital" radiology installation, the analog signals given by the camera are converted into digital signals, thus making it easier to process the signals, especially in order to improve the quality of the images on the screen.

These digital type of installations normally use pickup tubes of the plumbicon or saticon type, with photosensitive elements of very low remanence. The remanence of a photosensor is the property possessed by this device whereby, after receiving a light impulse during one frame (television picture), it gives an electrical signal, that decreases over time, to the following frame (or frames), after the disappearance of this light impulse. In other words, a photosensor retains the light signal received in memory for a certain period of time. High remanence implies a small decrease of the signal with time and, conversely, low remanence implies a big decrease of the signal given by the pick-up device.

A low remanence may be a great disadvantage, especially in radiology installations where it is sought to use the smallest possible dose of X-ray radiation for the patient, the result of which is a decrease in the signal/noise ratio owing to fluctuations of quantal origin, these fluctuation being limited by remanence which constitutes an integration in time.

This is why, in radioscopic installations using the plumbicon or saticon type of pick-up tube, a remanence is artificially introduced by means of a recursive filter.

This filter is generally made by means of a programming of digital processing means.

The inventor has observed that, in radiology installations of this type using television cameras with photosensitive elements of low remanence, the moving images are excessively fuzzy whereas this defect is far less apparent in radiology installations using cameras with vidicon or chalnicon tubes.

On the basis of these observations, the inventor has discovered that the difference in behaviour between low-remanence and high-remanence cameras is derived from the fact that, in tubes of the high-remanence vidicon type, this remanence varies with the level of the signal: the remanence is all the higher as the level of the signal is low. In order words, for strong signals (generally the white ones), the period of retention in memory is generally smaller than for weak signals. This property of the vidicon tube favours the viewing of the image on a television monitor by the human eye. For, in the dark zones of the picture, the quantal noise is all the more troublesome as the signal is weak. Furthermore, the eye is very sensitive to low luminosities. It will therefore be hampered more by fluctuations in the dark zones than by fluctuations in the light zones of the image. Higher remanence in the dark zones than in the light zones is therefore clearly an advantage for the dark zones. For the light zones, low remanence makes it possible, for moving pictures, to limit the streaking or overlapping of these light zones on the dark zones thus reducing the "lined" appearance and, hence, the fuzziness of the image.

Until now, with low-remanence pick-up tubes, an artificial remanence, independent of the signal level, is created, and this artificial remanence is sufficient to reduce the noise, i.e. fluctuations of quantal origin, in the dark zones but is not enough to prevent the fuzziness of moving pictures. In the installation according to the invention, the artificial remanence varies with the level of the signal. With the tube of the plumbicon or saticon type, a greater artificial remanence will be chosen for the dark zones than for the light zones. For tubes in which the noise is greater in the light zones than in the dark zones, the artificial remanence will vary in reverse to the above phenomenon, depending on the level, namely it will be greater at a high level than at a low level.

The description below will be limited to examples of remanence which are greater at low levels than at high levels.

3. Summary of the Invention

More precisely, the invention pertains to an imaging installation, especially for digital type radiology, comprising a television camera with a pick-up device presenting no remanence or low remanence, with a means such as a recursive filter to produce a remanence of the image signal given by the camera, an installation wherein the remanence varies with the level of the signal.

In the preferred embodiment of the invention, the recursive filter is such that it simulates the remanence of a vidicon tube.

BRIEF DESCRIPTION OF THE DRAWINGS

Other characteristics and advantages of the invention will appear from the following description of some of its embodiments, made with reference to the appended drawings, of which:

FIG. 1 shows a recursive filter,

FIG. 2 is a remanence graph for two vidicon tubes,

FIG. 3 is a graph showing a dependent function of the remanence, also for two vidicon tubes, FIG. 4 reproduces the graph of FIG. 2 with, in addition, a similar graph for a plumbicon tube associated with filters according to the invention, FIG. 5 reproduces the graph of FIG. 3 with, in addition, a similar graph for a plumbicon tube associated with other embodiments of a filter according to the invention, and FIG. 6 is a graph similar to that of FIG. 4, but for a plumbicon tube associated with alternative embodiments of a filter according to the invention.

DESCRIPTION OF THE PREFERRED EMBODIMENT

The example which shall be described with reference to the figures relates to a digital radiology installation comprising a television camera of the plumbicon type.

In an installation of this type, the analog signal corresponding to each point of the image is converted into a digital signal which may undergo various transformations before it is reconverted into an analog signal applied to a television screen.

Among the processing operations undergone by the digital signals, there is provision for one which will give it artificial remanence. This processing operation is done by means of a recursive filter shown in FIG. 1.

This filter has a first modulator 10, the input $10_1$ of which receives the input signal $x_n$, the signal of the said modulator at the output $10_2$ being the function $f_1(x_n)$ of the input signal. The output $10_2$ of the modulator 10 is connected to the first input $11_{11}$ of an adder 11, the second input $11_2$ of which receives the output signal $f_2(y_{n-1})$ of a second modulator 12, the input $12_1$ of which is connected to the output $11_3$ of the adder by means of a frame memory 13. The signal $y_n$ at the output of the adder 11 constitutes the output signal of the filter.

The signal $y_{n-1}$ at the input $12_1$ of the second modulator 12 corresponds to the signal appearing at the output $11_3$ at the preceding frame.

The signal $y_n$ at the output of the filter meets the following relationship:

$$y_n = f_1(x_n) + f_2(y_{n-1}) \quad (1)$$

A constant signal x at the input of the filter must be recovered at the output. The result of this is that the functions $f_1$ and $f_2$ must meet the following condition:

$$x = f_1(x) + f_2(x) \quad (2)$$

Usually, a recursive filter is of the linear type, namely the functions $f_1$ and $f_2$ are:

$$f_1(x) = (1-\lambda)x \quad (3)$$

$$f_2(x) = \lambda x \quad (4)$$

In these formulae, $\lambda$ is a constant that characterizes the remanence.

The invention provides for conferring non-linearity on the recursive filter. This non-linearity is deduced from an analysis, made within the scope of the invention, of the behaviour of vidicon tubes. This analysis is explained below.

Within the scope of this analysis, to simplify the explanation, it is assumed that the signal of maximum value is 1 and that the minimum signal is 0.

A vidicon tube is compared to a recursive filter. With a filter of this type, when the input signal goes from the maximum value 1 to the minimum value 0, the output signal is:

$$y_n = f_n(y_{n-1}) + f_1(0) \quad (5)$$

In the graph of FIG. 2, the frame numbers have been shown on the x-axis and the signal level (ranging between 0 and 1) has been shown on the y-axis. These values of the y-axis are of the logarithmic type.

Two vidicon tubes have been examined, one of the XQ 1290 type and the other of the XQ 1239 type. For each of these tubes, the signal $y_n$ has been measured at each frame, and the various points have been joined together. Thus, for the vidicon tube XQ 1290, the curve 15 is obtained and for the tube XQ 1385, the curve 16 is obtained.

It is observed that the ratio $$\frac{y_n + 1}{y_n}$$

decreases when n increases, namely that the remanence increases with n. In other words, again, the remanence increases when the level of the signal decreases.

This remanence, which is variable with the level, has been characterized by the following two parameters:

$$\lambda = \frac{y_{n+1}}{y_n} \text{ for a high value of } n \text{ and} \quad (6)$$

$$\mu = \frac{y_1}{y_0} \quad (7)$$

$\lambda$ is a parameter characteristic of the low-level remanence and $\mu$ is a parameter representing the high-level remanence. In the graph of FIG. 2, $\lambda$ corresponds to the slope of the curve 15 or 16 for the high numbers of the frame and $\mu$ to the slope of this curve 15 or 16 at the start.

To describe the behaviour of the tube when the input signal is brought from 1 to 0, the inventor has been led to define a function g(x) such that:

$$f_2(x) = x[\lambda(1 - g(x)) + \mu g(x)] \quad (8)$$

with: $g(0) = 0$, and $g(1) = 1$.

for the low values of x (low level of signal), we get:

$$f_2(x) = \lambda x \quad (9)$$

for $x = 1$ (high levels of the signal) we get:

$$f_2(1) = \mu x \quad (10)$$

It is thus seen that the function g(x) clearly characterizes the change in behaviour from low level remanence to high level remanence.

This function g(x) can be deduced from the curve 15 or 16 (plotted experimentally) on the basis of the following relationship:

$$g(y_n) = \frac{1}{\mu - \lambda} \left[ \frac{y_{n+1}}{y_n} - \lambda \right] \quad (11)$$

This relationship (11) results firstly from the formula (8) which leads to the following relationship:

$$g(x) = \frac{1}{\mu - \lambda} \left[ \frac{f_2(x)}{x} - \lambda \right] \quad (12)$$

and, secondly, from the above relationship from which the following can be deduced:

$$f_2(y_{n-1}) = y_n - f_1(0); \quad (13)$$

In this latter relationship $f_1(0)$ is written:

$$f_1(0) = 0 - f_2(0) = 0; \quad (14)$$

$$\frac{f_2(y_{n-1})}{y_{n-1}} = \frac{y_n}{y_{n-1}} \quad (15)$$

thus justifying the relationship (11).

The graph of FIG. 3 gives the function g(x) on the y-axis and the variable x on the x-axis. The curve 17 corresponds to the vidicon tube XQ 1290 and the curve 18 to the vidicon tube XQ 1395.

The invention provides for a recursive filter associated with a plumbicon tube which has the functions of modulation $f_1$ and $f$ which are deduced from the curves 17 or 18 or from approximations of these curves. In other words, the invention provides for recursive filters with a function $f_1$ and $f_2$ used to simulate the behaviour of vidicon tubes.

In a first, very simple embodiment, the curves 17 and 18 are compared to straight lines, namely a linear approximation is made such that:

$$g(x) = x. \qquad (16)$$

Therefore:

$$f_1(x) = (\lambda - \mu)x^2 + (1-\lambda)x \qquad (17)$$

$$f_2(x) = (\lambda - \lambda)x^2 + \lambda x. \qquad (18)$$

From the formula (11) above, we deduce the law of remanence linking $y_{n+1}$ and $y_n$:

$$y_{n+1} = (\mu - \lambda)y_n^2 + \lambda y_n \qquad (19)$$

In the graph of FIG. 4, similar to that of FIG. 2, we have shown the curves 15 and 16 as well as the curves 15' and 16' which correspond to the linear approximation, these curves having been calculated by means of the above formula (19).

It is noted that, for large frame numbers, namely for low levels, the curves 15' and 16' have a slope which is substantially greater than that of the curves 15 and 16. Thus, at a low signal level, there is a danger that the remanence will be inadequate.

This is why we prefer an approximation of the function g(x) of the type shown in FIG. 5 which is a graph similar to that of FIG. 3 and which shows the curves 17 and 18 representing the functions g(x) for the vidicon tubes XQ 1290 and XQ 1395. Also, there are the curves 17' and 18', each being formed of three segments and constituting an approximation of a curve 17 or 18. Thus the curve 17' has a first segment $17'_1$ on the x-axis bounded by the origin 0 and the point $M_1$ of the x-axis $x_1$. The second segment $17'_2$ is a straight line segment, the end points of which are, firstly, the point $M_1$ and secondly, a point $M_2$ of the coordinates $x_2$ and $y_2$. The third segment $17'_3$ joins the point $M_2$ to the point $M_3$ of the coordinates: $x=1, y=1$.

In other words, this approximation of the curve g(x) can be defined as follows:

$$o \leq x \leq x_1 \; g(x) = 0 \qquad (20)$$

$$x_1 \leq x \leq x_2 \; g(x) = \frac{(x-x_1)y_2}{x_2 - x_1} \qquad (21)$$

$$x_2 \leq x \leq 1 \; g(x) = \frac{(x-x_2)(1-y_2)}{1-x_2} + y_2 \qquad (22)$$

The result obtained with an approximation of this type is quite satisfactory, for the law of remanence obtained in this way is practically identical to the law of remanence for the vidicon tube.

For this approximation, five parameters are used: $\lambda, \mu, x_1, x_2$ and $y_2$.

This approximation can be simplified by using only four parameters. This approximation consists in setting the segment $17'_3(M_2M_3)$ in a direction parallel to the x-axis. In other words, the point $M_2$ then has $x_2$ and 1 as coordinates.

In this case, g(x) is defined by the following formulae:

$$o \leq x \leq x_1 \; g(x) = 0 \qquad (23)$$

$$x_1 \leq x \leq x_2 \; g(x) = \frac{x - x_1}{x_2 - x_1} \qquad (24)$$

$$x_2 < x < 1 \; g(x) = 1 \qquad (25)$$

In this case the four parameters $\lambda, \mu, x_1, x_2$ which define the recursive filter, all have one physical meaning: $\lambda$ is the low level remanence, $\mu$ is the high level remanence, $x_1$ is the upper limit of the low levels and $x_2$ is the lower limit of the high levels.

The graph of FIG. 6 corresponds to this approximation. It is similar to the one shown in FIG. 2. Moreover, the curves 15 and 16 have been repeated in this FIG. 6. The curve 15", corresponding to the approximation for the vidicon tube XO 1290, is identical with curve 15. For the curve 16" corresponding to the simulation of the tube XQ 1395, the difference in behaviour is practically negligible.

To make the modulators 10 and 12 (FIG. 1), memories of the correspondence table type are used for example.

For the memory or table 10, the function $f_1(x)$ is as follows (in the case of the approximation of g(x) on three segments, the last one of which is parallel to the x-axis):

$$f_1(x) = x[(1-\lambda)(1-g(x)) + (1-\mu)g(x)] \qquad (26)$$

For the module or table 12, the function $f_2(x)$ is:

$$f_2(x) = x[\lambda(1-g(x)) + \mu g(x)] \qquad (27)$$

It is known that the video signals transmitted to a television screen must show a gamma correction. This gamma correction is done either before the filter, namely before the input $10_1$, or in the filter itself by a modification of the modulator 10, namely of the function $f_1$ alone. In this case, instead of taking, for example, the function defined above in (26) as the function $f_1$, we use the function:

$$f\Gamma(x) = f_1(\Gamma(x)) \qquad (28)$$

In this formula, $\Gamma(x)$ is the gamma correction.

Finally, it has been observed that, under certain conditions and in certain cases, especially with a recursive filter defined on the basis of the function g(x) with three segments, the third segment $M_2M_3$ of which is parallel to the x-axis, a saturation that hampered the signal was obtained. In other words, the maximum value of the output signal could exceed the value 1. A situation of this type occurs especially during a sudden transition from 0 to 1. To remedy this disadvantage, i.e. so that the output signal y is always below 1, it was calculated that the four parameters $\lambda, \mu, x_1$ and $x_2$, which define the recursive filter, should meet the following conditions:

$$\text{If: } \frac{x_1}{x_M} \leq 1 - \sqrt{1 - \frac{x_2}{x_M}}$$

-continued $$\text{there must be: } \frac{\mu}{\lambda} \geq \cfrac{1}{1 + \cfrac{x_2 - x}{x_2} \cdot \cfrac{1 + \sqrt{1 - \cfrac{x_2}{x_M}}}{1 - \sqrt{1 - \cfrac{x_2}{x_M}}}}$$

$$\text{If: } \frac{x_1}{x_M} \geq 1 - \sqrt{1 - \frac{x_2}{x_M}}$$

$$\text{there must be: } \frac{\mu}{\lambda} \geq \frac{x_1}{x_M}$$

In these formulae, $x_M$ is the maximum value of the signal x.

What is claimed is:

1. A radiological imaging installation, comprising:
   a television camera having a pickup device, said pickup device presenting no or low remanence; and
   non-linear means for producing a remanence of an image signal supplied by said television camera, said non-linear means connecting to said pickup device, and said remanence produced by said non-linear means varying with the level of said image signal.

2. An installation according to claim 1, wherein:
   said non-linear means is a recursive filter.

3. An installation according to claim 2, wherein:
   the remanence produced by said non-linear means becomes high when the level of said image signal is low.

4. An installation according to claim 3, wherein:
   said non-linear means connecting to said pick-up device of said television camera results in a remanence behavior similar to a vidicon tube or chalnicon tube.

5. An installation according to claim 3 or 4, wherein:
   said non-linear means has an input signal modulator connected to a first input of an adder, an output of said adder forming an output of said recursive filter, said output of said adder connecting to a frame memory connected to a second modulator, said second modulator connecting to a second input of said adder, said input signal modulator and said second modulator being selected so as to produce said remanence which varies according to the level of said image signal.

6. An installation according to claim 5, wherein:
   a function $f_1$ of said input signal modulator contains a gamma correction.

7. An installation according to claim 5, wherein:
   said second modulator introduces a modulation defined by the function:

$$f_2(x) = x[[(1-g(x)) + \mu g(x)],$$

a formula wherein x is the ratio between the signal applied to the input of the second modulator with the maximum value of the input signal, $\lambda$ and $\mu$ are constants and g(x) is a linear function of x meeting the conditions: $g(0)=0$, and $g(1)=1$.

8. An installation according to claim 7 wherein: $g(x)=x$.

9. An installation according to claim 7 wherein the function g (x) is defined in the following manner:

$$0 \leq x \leq x_1 \quad g = 0$$

$$x_1 \leq x \leq x_2 \quad g = \frac{(x - x_1)y_2}{x_2 - x_1}$$

$$x_2 \leq x \leq 1 \quad g = \frac{(x - x_2)(1 - y_2)}{1 - x_2} + y_2$$

$x_1$, $x_2$ and $y_2$ being constants.

10. An installation according to claim 7 wherein the function g (x) is defined in the following manner:

$$0 \leq x \leq x_1 \quad g = 0$$

$$x_1 \leq x \leq x_2 \quad g = \frac{x - x_1}{x_2 - x_1}$$

$$x_2 \leq x \leq 1 \quad g = 1$$

$x_1$ and $x_2$ being constants.

11. An installation according to claims 1, 3 or 4 wherein:
   said pick-up device comprises a plumbicon tube or saticon tube.

* * * * *